United States Patent
Liu

(10) Patent No.: US 12,399,898 B1
(45) Date of Patent: Aug. 26, 2025

(54) OPTIMIZED PARTITIONING METHOD FOR HIVE TABLES

(71) Applicant: eBay Inc., San Jose, CA (US)

(72) Inventor: Lietong Liu, Shanghai (CN)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/677,086

(22) Filed: May 29, 2024

(51) Int. Cl.
  *G06F 16/2455* (2019.01)
  *G06F 16/27* (2019.01)

(52) U.S. Cl.
  CPC .. *G06F 16/24554* (2019.01); *G06F 16/24564* (2019.01); *G06F 16/278* (2019.01)

(58) Field of Classification Search
  CPC ............. G06F 16/24554; G06F 16/278; G06F 16/24564
  See application file for complete search history.

(56) References Cited

U.S. PATENT DOCUMENTS

| | | | |
|---|---|---|---|
| 8,423,532 | B1 | 4/2013 | Beckford et al. |
| 8,886,631 | B2 | 11/2014 | Abadi et al. |
| 9,495,427 | B2 | 11/2016 | Abadi et al. |
| 10,678,810 | B2 | 6/2020 | Rehal |
| 2018/0068008 | A1 | 3/2018 | Cruanes et al. |
| 2022/0076165 | A1 | 3/2022 | Minkin et al. |

FOREIGN PATENT DOCUMENTS

| | | |
|---|---|---|
| CN | 112347097 | 2/2021 |
| CN | 109902101 | 4/2021 |
| CN | 115016737 | 9/2022 |
| CN | 116089391 | 5/2023 |
| CN | 117632860 | 3/2024 |

OTHER PUBLICATIONS

CN104731921A—Method for storing and processing small log type files in Hadoop distributed file system (Year: 2015).*
CN108256115A SparkSql-oriented (Spark structured query language-oriented) HDFS (Hadoop distributed file system) small file real-time merging implementation method (Year: 2015).*
CN117632860A Small file merging method and device based on Flink engine and electronic equipment (Year: 2015).*
"Using Apache Hive", Cloudera, (Aug. 2019), 64 pgs.
Ma, Gang, "Explore eBays New Optimized Spark SQL Engine for Interactive Analysis", [Online]. Retrieved from the Internet: https: innovation.ebayinc.com tech engineering explore-ebays-new-optimized-spark-sql-engine-for-interactive-analysis , (May 2021), 8 pgs.

* cited by examiner

Primary Examiner — Hau H Hoang
(74) Attorney, Agent, or Firm — SCHWEGMAN LUNDBERG & WOESSNER, P.A.

(57) ABSTRACT

Systems and methods are directed to optimizing partitioning of Hive tables. The system aggregates query data associated with a file system and analyzes data partitioning and query patterns derived from the aggregated query data. The system then generates one or more merge rules for merging partitions of at least some data types that do not satisfy a query threshold based on the query patterns. The one or more merge rules are registered into a Hive metastore such that the one or more rules can be accessed during a write or read process. Based on the one or more rules, the system can then merge partitions of the at least some data types that do not satisfy the query threshold into a single physical partition of the file system.

20 Claims, 6 Drawing Sheets

OPTIMIZED PARTITIONING METHOD FOR HIVE TABLES

TECHNICAL FIELD

The subject matter disclosed herein generally relates to big data engineering. Specifically, the present disclosure addresses systems and methods for optimizing partitioning of hive tables in big data engineering.

BACKGROUND

Conventionally, each partition of a Hive table corresponds to a subdirectory on the Hadoop file system (HDFS) which stores all data for that partition. This method, while straightforward, has limitations. A common issue arises when a field, configured as a partition field to accelerate queries, has a vast number of values with severe data skew, whereby most data belong to a few top values. This leads to two problems. First, there is a proliferation of small files and directories, which puts significant pressure on the HDFS NameNode and adversely affects read/write performance. Secondly, excessive partitions in the Hive table puts substantial pressure on the Hive metastore, which affects the read/write operations of Hive table metadata.

DETAILED DESCRIPTION

Figure 1:
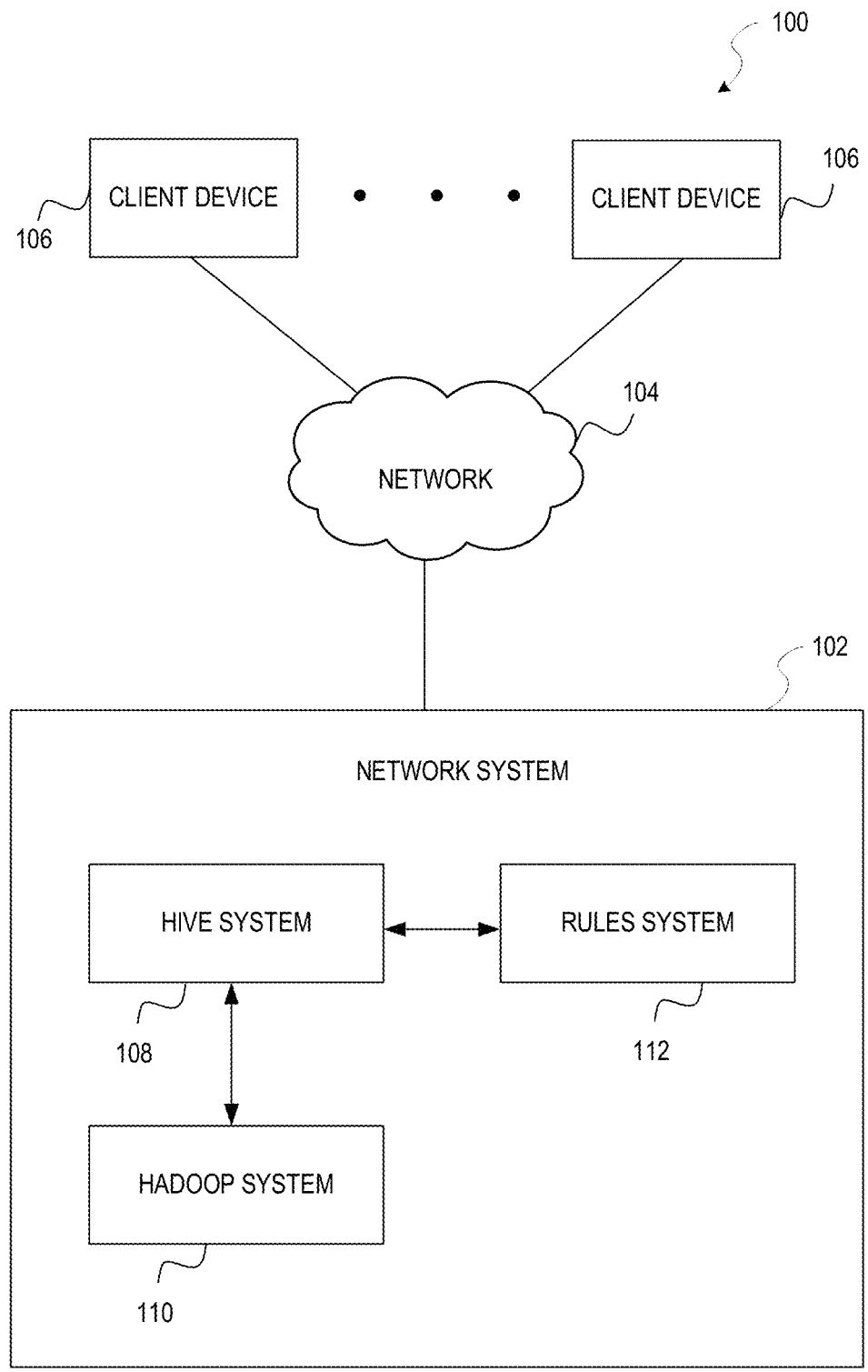
FIG. 1 is a diagram illustrating an example network environment suitable for optimizing partitioning for Hive tables, according to example implementations.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Systems and methods that optimize partitioning for Hive tables are discussed herein. Conventionally, each partition of a Hive table corresponds to a subdirectory on the Hadoop file system (HDFS). This structure leads to at least two technical problems. First, because of the large number of small files and directories, significant pressure is placed on the HDFS NameNode, which adversely affects read/write performance. Secondly, excessive partitions in the Hive table causes substantial pressure on the Hive metastore, which affects the read/write operations of Hive table metadata.

Example implementations provide a technical solution to these technical problems by optimizing a partitioning method for Hive tables. More specifically, example implementations provide a rule-based system for merging smaller partitions into a single large partition in the HDFS. This is in contrast to conventional methods that treat each partition as a separate subdirectory in the HDFS. The HDFS is not changed, but the way the HDFS is accessed through the Hive table is changed.

The optimized partitioning method and rule-based system comprises several key operations. First, based on data partitioning and query patterns, partition merge rules are generated that indicate which small partitions (e.g., partitions that are rarely queried or contain very little data) should be merged into a single larger partition. Secondly, the partition merge rules are registered into the Hive metastore. This allows for the partition merge rules to be accessed whenever corresponding metadata is accessed. Thirdly, a data computing engine (also referred to herein as an "execution engine") is modified to support reading from and writing to the large partition that comprises the merged smaller partitions. More specifically, during the writing process, small partitions can be merged into a single physical partition based on the partition merge rules. Metadata of logical partition values contained in the single physical partition is then synchronized to the Hive metastore. Then, during the reading process, the physical partitions that need to be read are filtered based on partition filter conditions and the metadata of the logical partition values contained in the physical partition.

As a result, example implementations provide a technical solution that effectively reduces the number of small files and directories in the HDFS, which has the technical effect of reducing load on the HDFS NameNode and the Hive metastore. Additionally, example implementations modify the data computing engine to support reading from and writing to these merged partitions. This provides a further technical effect of enhancing the efficiency of data queries. Furthermore, as data distribution and query patterns change, the partition merge rules can be updated, ensuring forward and backward compatibility.

FIG. 1 is a diagram illustrating an example network environment 100 suitable for optimizing partitioning for Hive tables, according to example implementations. A network system 102 provides server-side functionality via a communication network 104 (e.g., the Internet, wireless network, cellular network, or a Wide Area Network (WAN)) to a plurality of client devices 106. The network system 102 is configured to store and provide access to big data in a Hadoop file system (HDFS), as will be discussed in more detail below.

In various cases, the client device 106 is a device associated with a user of the network system 102 that wants to write data to the network system 102 and/or read data from (e.g., query) the network system 102, using functionalities of the network system 102. The client device 106 may comprise, but is not limited to, a smartphone, a tablet, a laptop, multi-processor systems, microprocessor-based or programmable consumer electronics, a desktop computer, a server, or any other communication device that can access the network system 102. The client device 106 can include an application that exchanges data, via the network 104, with the network system 102. For example, the application can be browser application or a local version of an application associated with the network system 102 that can provide data to and access data from the network system 102. Additionally, the client device 106 comprises a display component (not shown) to display information (e.g., in the form of user interfaces). The client device 106 can be operated by a human user and/or a machine user.

In example implementations, the client device 106 interfaces with the network system 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (e.g., Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

Turning specifically to the network system 102, the network system 102 comprises components that write data to and read data from the HDFS as well as generate rules that optimize partitioning for Hive tables. In example implementations, the network system 102 comprises a Hive system 108, a Hadoop system 110, and a rules system 112 configured to interact with each other to perform these operations. These systems and their interactions will be discussed in more detail in connection with FIG. 2 below.

Any of the systems or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one component may, in alternative examples, be embodied in a different component. Additionally, any number of client devices 106 may be embodied within the network environment 100. While only a single network system 102 is shown, alternatively, more than one network system 102 can be included (e.g., localized to a particular region).

Figure 2:
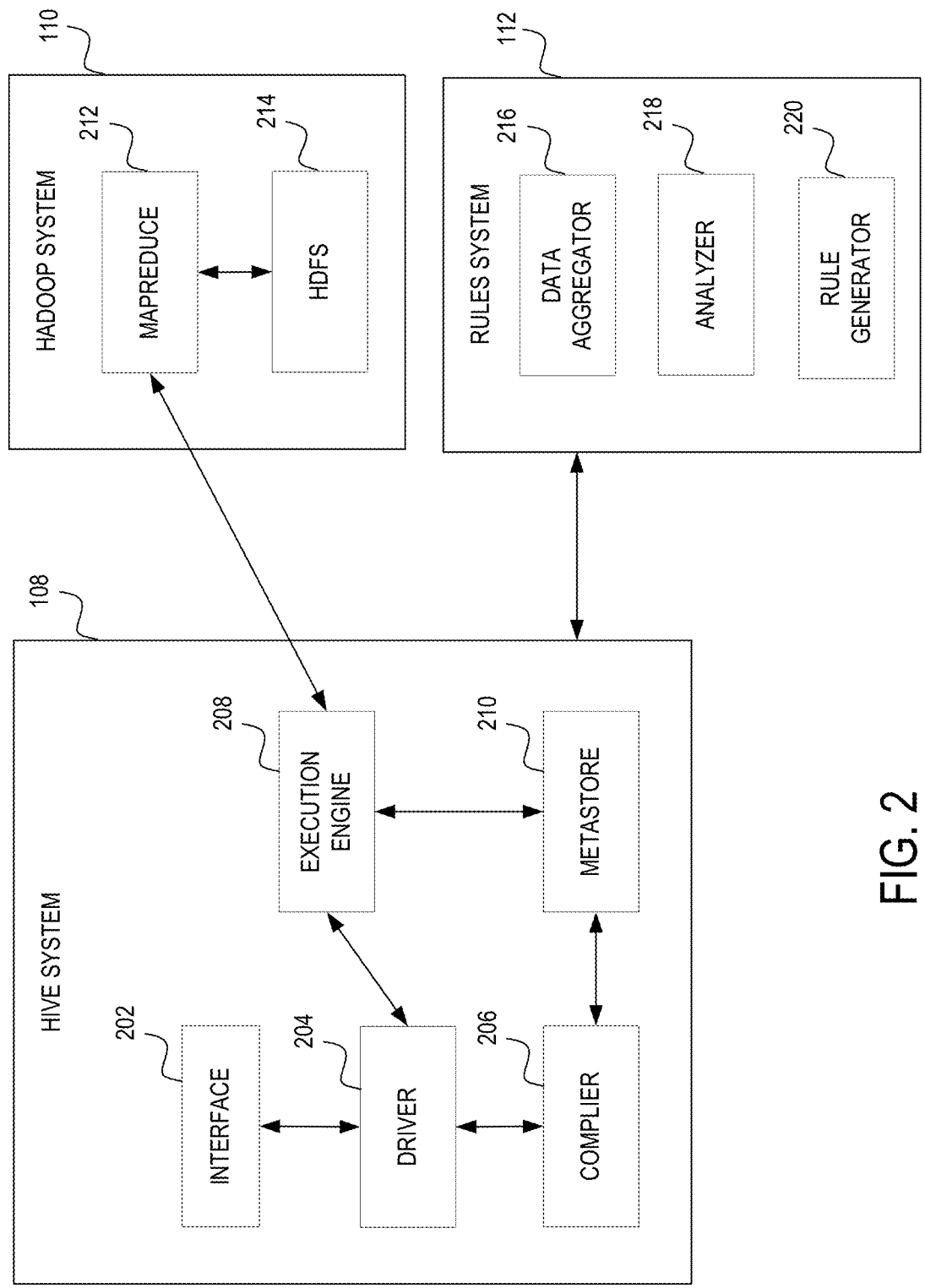
FIG. 2 is a diagram illustrating components of a Hive system, a Hadoop system, and a rules system and their interactions in the network environment, according to example implementations.

FIG. 2 is a diagram illustrating components of the Hive system 108, the Hadoop system 110, and the rules system 112 and their interactions in the network system 102, according to example implementations. In example implementations, the rules system 112 generates partition merge rules that merge small partitions into a single large partition. The small partitions represent partitions that are rarely queried (e.g., below a query threshold) or that contain a small amount of data (e.g., below a data threshold). By optimizing the partitioning method, the number of small files and directories are reduced and the pressure on the Hive metastore is also reduced. FIG. 2 illustrates the components that interact with each other in order to optimize the partitioning method and utilize the merged partitions.

The Hive system 108 is configured to interact with the client device 106 and to perform data operations with the Hadoop system 110. For example, if the client device 106 wants to write to or read from (e.g., perform a query) the Hadoop system 110, the client device 106 interacts with the Hive system 108 which acts as an intermediary with the Hadoop system 110. In example implementations, the Hive system 108 comprises an interface 202, a driver 204, a compiler 206, an execution engine 208, and a metastore 210.

The interface 202 is configured to interact and exchange information with the client device 106. For instance, the interface 202 receives a query from the client device 106 and in response, returns requested data for the query. In example implementations, the interface 202 can be, for example, Hive Web User Interface, Hive Command Line (HCl), and/or Hive HDInsight. In some implementations, the Hive system 108 processes and queries data using Hive Query Language (HQL), which is a structured query language (SQL)-like language. When the interface 202 receives a query, the interface 202 transmits the query to the driver 204.

The driver 204 is configured to interact with a complier 206 to retrieve a plan for executing the query. In some cases, the driver 204 or the complier 206 parses the query to check syntax and requirements of the query. In some implementations, the complier 206 translate the HQL query into a MapReduce input. Additionally, the complier 206 can create an execution plan to be executed and sends a metadata request to the metastore 210 for metadata corresponding to the query.

The metastore 210 stores different data about the Hive tables including, for example, location, schema, column names, data types, and information about partitions. Each Hive table has a corresponding directory in a Hadoop distributed file system (HDFS) 214, whereby data is serialized and stored as files within that directory. Each Hive table can be broken into partitions and each partition determines distribution of data within sub-directories. Each partition represents a logical grouping of data within a table, organized based on a value of one or more partition keys. A partition key is a column in the table, and each partition contains all the data for a specific value of that column. Data in each partition can further be divided into buckets and each bucket can be stored as a file in a partition directory. The metastore 210 maintains metadata about the Hive table including a "partition specific path" to a location of a partition containing data for retrieval from the HDFS 214.

Additionally, the metastore 210 comprises partition merge rules generated by the rules system 112 and registered with the metastore 210. These partition merge rules indicate which small partitions should be (or have been) merged into a single larger partition. The partition merge rules are used by the execution engine 208 during the writing and/or reading of data to/from the HDFS 214 as will be discussed in more detail below.

The metadata is received/retrieved from the metastore 210 by the complier 206. In some cases, the complier 206 also receives any corresponding partition merge rules (e.g., as part of the metadata). The complier 206 gathers all the information and relays the execution plan along with the metadata back to the driver 204. The driver 204 then sends the execution plan to the execution engine 208 (also referred to herein as a "data computing engine").

The execution engine 208 is configured to process the query by acting as a bridge between the Hive system 108 and the Hadoop system 110. The Hadoop system 110 is a framework that stores, processes, and analyzes data and includes a MapReduce 212 and the HDFS 214. Specifically, the HDFS 214 acts as a master server and manages files, control client device 106 access to the files, and overseas file operating processes such as renaming, opening, and closing of the files. The execution engine 208 sends a job to a JobTracker, found in a Name node, and assigns it to a TaskTracker, in a Data node in the HDFS 214. In example implementations, the query executes in the MapReduce 212 at the Hadoop system 110 to retrieve results (e.g., requested data) from the HDFS 214. The execution engine 208 then receives the results from the Data node of the HDFS 214.

In example implementations, the execution engine 208 is modified to support reading from and writing to smaller partitions merged into a single larger partition. In some cases, a plug-in is provided to the execution engine 208 which configures the execution engine 208 to support the optimized partitioning methods discussed herein. In operation, the execution engine 208 receives metadata/partition merge rule(s) from the metastore 210 indicating that the partition-specific path for retrieval of the results of a query includes other data in addition to data specifically for the query (referred to as "requested data"). In some cases, the execution engine 208 receives the metadata/partition merge rules via the driver 204. In other cases, the execution engine 208 accesses any applicable partition merge rules directly from the metastore 210. In implementations where the results are from a merged partition, the execution engine 208 filters the results to obtain just the requested data. The execution engine 208 sends the requested data back to the driver 204, which relays the results through the interface 202 back to the client device 106.

For a write process, the execution engine 208 determines whether one or more merge rules apply to new data to be written to the HDFS 214. In some cases, the execution engine 208 receives the metadata/partition merge rules via the driver 204. In other cases, the execution engine 208 accesses any applicable partition merge rules directly from the metastore 210. If one or more partition merge rules apply, the execution engine 208 writes the new data to a single (merged) physical partition of the HDFS 214. Additionally, the execution engine 208 communicates with the metastore 210 to perform metadata operations. For example, the execution engine 208 can indicate what data has been stored to the merged partition such that the metastore 210 is updated with metadata that indicates that the partition path for the (merged) larger partition contains that data. Specifically, the metadata of all logical partition values contained in the physical partition is synchronized to the Hive metastore 210.

The rules system 112 analyzes query data (e.g., data regarding queries performed by the Hive system 108), determines which partitions to merge based on the analysis, and generates the partition merge rules. To enable these operations, the rules system 112 comprises a data aggregator 216, an analyzer 218, and a rule generator 220. The data aggregator 216 aggregates query data that indicates how often specific data or their corresponding partitions are queried. For example, assume a column in the Hive table is an action type such as, for example, click, like, unlike, save, and so forth. Additionally, assume there are 1000 possible action types. Data queries for these 1000 action types are tracked and aggregated by the data aggregator 216.

Conventionally, each data type (e.g., action type) results in a different partition and thus a different partition path or HDFS path. Continuing with the "action type" example, assume further that the partition columns include not only the action type but also a date and time. Under these conditions, for each day, there are 24 hours and 1000 action types resulting in 24,000 partitions daily. In a year, that will result in over 8.7 million partitions and corresponding HDFS paths. Typically, however, a top number (e.g., top 10) of data types (e.g., action types) comprises a significant percentage (e.g., 99%) of the queries. The remaining data types (e.g., 990) only account for a tiny amount (e.g., 1%) of the queries.

The analyzer 218 analyzes the aggregated query data to determine these query patterns and analyzes these query patterns along with data partitioning to determine which partitions to merge. In some cases, the analyzer 218 identifies data types that exceed a predetermined query threshold (e.g., queried X number of times, queried 30% of the time). In some implementations, data types associated with a top number of query patterns that meet or exceed a predetermined query threshold will maintain their separate partitions and thus, maintain their individual partition/HDFS path. However, the remaining data types (e.g., that do not meet the predetermined query threshold) will have their partitions merged into one or more larger partitions.

The rule generator 220 is configured to generate the partition merge rules. After analysis by the analyzer 218, the rule generator 220 generates one or more partition merge rules indicating that the data types that do not satisfy the predetermined query threshold will have their partitions merged (e.g., during a writing process). Thus, partitions with low queries or that are queried below the predetermined query threshold, for example, can be merged into a larger partition. Once the partition merge rule is generated, the rule generator 220 registers the partition merge rule with the Hive metastore 210. In example implementations, the partition merge rule is registered using an enhanced data definition language (DDL) syntax.

In some implementations, the rules system 112 can be embodied within a machine learning system. The machine learning system trains a machine learning model using past query data, past query patterns, and past partition merge rules. The machine learning system then uses the machine learning model to automatically determine which partitions to merge based on new query data and new query patterns. The number of partitions to merge or a query threshold that triggers the merging of partitions can also be determined by the machine learning model. The machine learning model can factor in a level of performance tolerance (e.g., downgrade of the query performance) in determining whether and which partitions should be merged. Once the machine learning model determines the partitions to merge, the machine learning model generates the partition merge rule(s) and generates a command to the Hive metastore 210 to register these partition merge rule(s).

The machine learning system can continuously update the partition merge rules using the machine learning model. In particular, new query patterns are determined based on the new query data. Based on the new query patterns, the machine learning model determines new partition merge rules.

Figure 3:
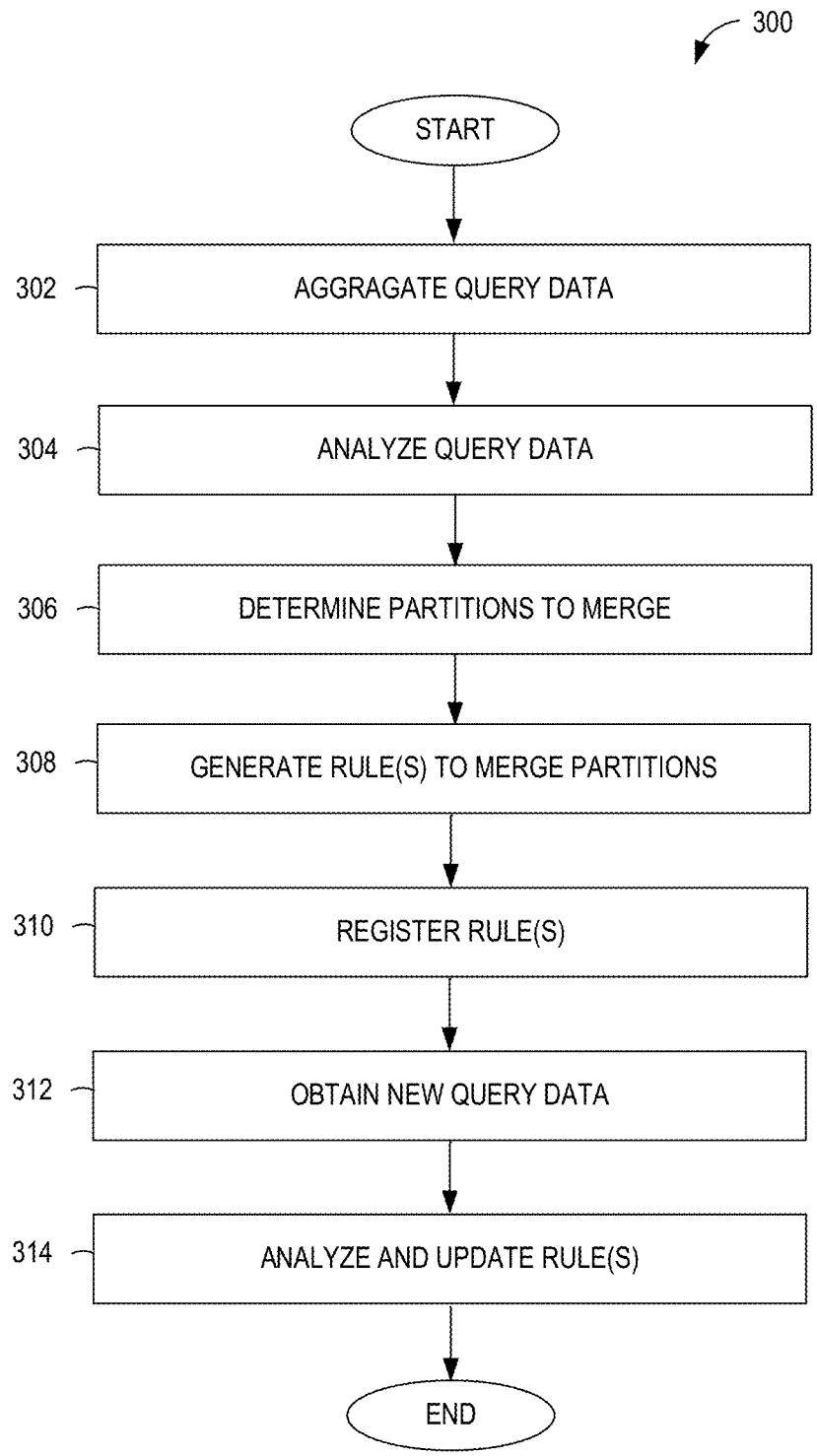
FIG. 3 is a flowchart illustrating operations of a method for generating partition merge rules, according to example implementations.

FIG. 3 is a flowchart illustrating operations of a method 300 for generating partition merge rules, according to example implementations. Operations in the method 300 may be performed by the rules system 112, using components described above with respect to FIG. 2. Accordingly, the method 300 is described by way of example with reference to the rules system 112. However, it shall be appreciated that at least some of the operations of the method 300 may be deployed on various other hardware configurations or be performed by similar components residing elsewhere in the network environment 100. Therefore, the method 300 is not intended to be limited to the rules system 112.

In operation 302, the data aggregator 216 aggregates query data. The query data indicates how often specific data or their corresponding partitions are queried from the HDFS 214 via the Hive system 108.

In operation 304, the analyzer 218 analyzes the aggregated query data to determine query patterns. The analysis can happen at a predetermined time (e.g., every night, once a week), when a predetermined amount of query data has been aggregated, or be triggered by an operator/administrator of the network system 102. The query patterns indicate which data types account for a majority of the queries or are queried above a predetermined query threshold. The query patterns also indicate which data types are rarely if ever queried or are queried below a predetermined query threshold.

In operation 306, the analyzer 218 determines partitions that should be merged. The data types associated with query patterns that meet or exceed the predetermined query threshold or account for the majority of the queries (e.g., top 10 queried data types) will maintain their separate partitions and thus, maintain their individual partition/HDFS path. However, the remaining data types (e.g., that do not meet the predetermined query threshold) will have their partitions merged into one or more larger partitions.

In some implementations, the remaining data types are merged into a single large partition. However, alternative implementations can merge the remaining data types into more than one large partition. For example, the partitions for the remaining data types can be merged such that a first large partition accounts for 50% of the queries of the remaining data types and a second large partition accounts for the other 50% or the queries.

In operation 308, the rule generator 220 generates one or more partition merge rules to merge the partitions for the data types having low queries (e.g., not in the top 10) or that do not satisfy the predetermine query threshold. Each partition merge rule indicates the data types that should have their partitions merged into a large partition.

In operation 310, the rules generator 220 registers the partition merge rules with the Hive metastore 210. By registering the partition merge rules, the Hive system 108 (e.g., the execution engine 206) will be able to determine which partition path or HDFS path to take to retrieve the requested data (or write data to) and whether the HDFS path leads to a merge partition or a non-merged partition.

In operation 312, the data aggregator 216 continuously obtains new query data. Subsequently, in operation 314, the analyzer 218 analyzes the new query data and, based on new query patterns, the rule generator 220 can update the partition merge rules as needed. Thus, the rules for merging small partitions can be changed at any time according to changing data distribution and query patterns, ensuring forward and backward compatibility.

Figure 4:
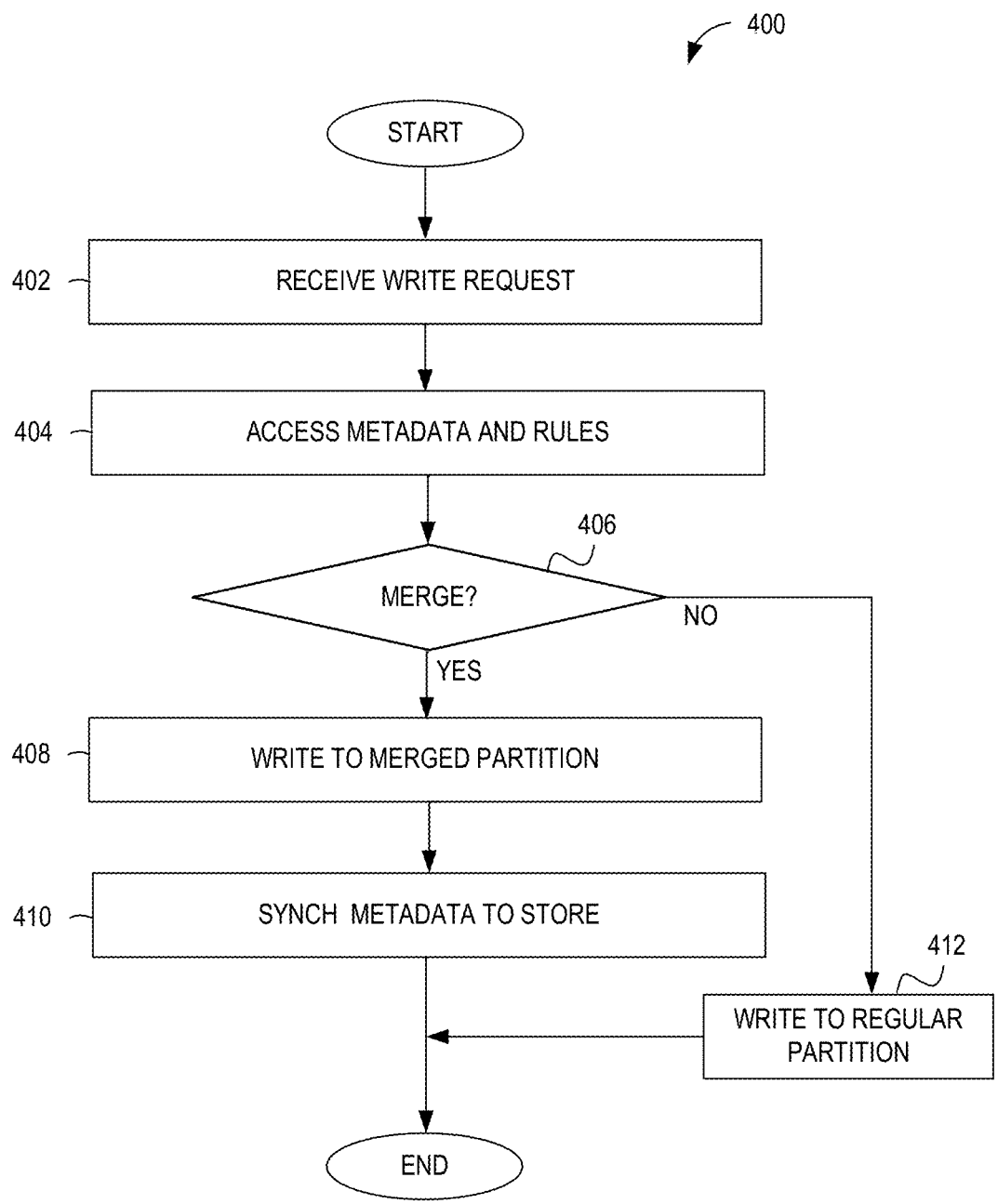
FIG. 4 is a flowchart illustrating operations of a method for writing data in the network environment, according to example implementations.

FIG. 4 is a flowchart illustrating operations of a method 400 for writing data in the network environment 100, according to example implementations. Operations in the method 400 may be performed by the Hive system 108, Hadoop system 110, and the rules system 112, using components described above with respect to FIG. 2. Accordingly, the method 400 is described by way of example with reference to the Hive system 108, Hadoop system 110, and the rules system 112. However, it shall be appreciated that at least some of the operations of the method 400 may be deployed on various other hardware configurations or be performed by similar components residing elsewhere in the network environment 100.

In operation 402, the interface 202 of the Hive system 108 receives a write request from the client device 106. In example implementations, the write request comprises a request to store data to the HDFS 214 of the Hadoop system 110.

In a conventional method, each write request will result in a different HDFS path (to a corresponding partition) for each data type. For example and continuing with the "action type" example, the Hive system 108 (e.g., execution engine 208) creates a first partition path to a first partition for an action type "click" and a second partition path to a second partition for an action type "like." In example implementations, if action type "click" and action type "like" do not satisfy the predetermined query threshold, the corresponding partitions for these action types can be merged, depending on the corresponding partition merge rules.

As such, in operation 404, metadata and partition merge rule(s) are accessed from the metastore 210 based on the write request. In example implementations, the driver 204 receives the write request and interacts with the complier 206, which creates an execution plan to be executed and sends a metadata request to the metastore 210. The metadata associated with the write request, which can include any corresponding partition merge rules, is returned to the complier 206. The complier 206 relays the execution plan along with the metadata back to the driver 204, which sends the execution plan and metadata to the execution engine 208 (or data computing engine). In an alternative implementation, the metadata and/or the partition merge rules are accessed directly from the metastore 210 by the execution engine 208.

In operation 406, a determination is made whether the metadata/rule(s) indicate that a partition to be written to is merged (or should be merged) into a larger partition. If the metadata/rule(s) indicate that the partition is merged, then in operation 408, the execution engine 208 triggers the write to a single physical (merged) partition of the HDFS 214. Continuing with the "action type" example, "click" and "like" are merged into a single partition path and any corresponding data for "click" and "like" are written to the same large partition associated with the single partition path.

In operation 410, the execution engine 208 synchronizes metadata for the merged partition to the metastore 210. In some implementations, the metadata of all logical partition values contained in the physical partition is synchronized to the Hive metastore 210.

Returning to operation 406, if there are no partition merge rules associated with the write query or the partition merge rule(s) indicate that the partition is not merged, then the execution engine 208 triggers writing of the data to a regular/non-merged physical partition in the HDFS 214 that corresponds to the data type in operation 412.

Figure 5:
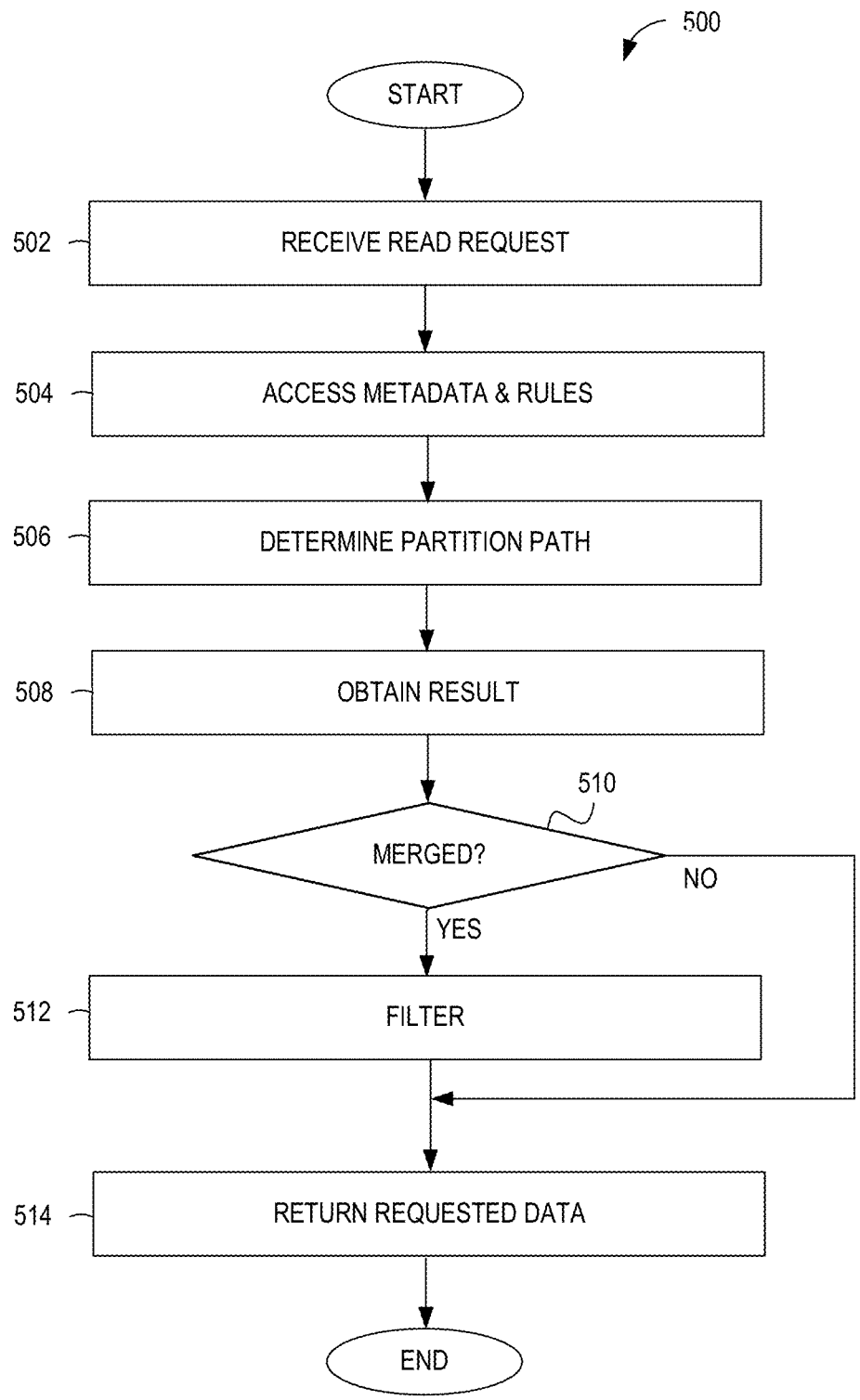
FIG. 5 is a flowchart illustrating operations of a method for reading data in the network environment, according to example implementations.

FIG. 5 is a flowchart illustrating operations of a method 500 for reading/querying data in the network environment 100, according to example implementations. Operations in the method 500 may be performed by the Hive system 108, Hadoop system 110, and the rules system 112, using components described above with respect to FIG. 2. Accordingly, the method 500 is described by way of example with reference to the Hive system 108, Hadoop system 110, and the rules system 112. However, it shall be appreciated that at least some of the operations of the method 400 may be deployed on various other hardware configurations or be performed by similar components residing elsewhere in the network environment 100.

In operation 502, the interface 202 of the Hive system 108 receives a read request from the client device 106. In example implementations, the read request is a query for data from the HDFS 214 of the Hadoop system 110.

In operation 504, metadata and partition merge rule(s), if applicable, are accessed from the metastore 210. In some implementations, the driver 204 interacts with the complier 206 to obtain a plan for executing the query. The complier 206 can create the execution plan to be executed and sends a metadata request to the metastore 210, which maintains partition paths to data for retrieval from the HDFS 214 and the partition merge rules. The metadata associated with the query, which can include any partition merge rules, is returned to the complier 206, and the complier 206 relays the execution plan along with the metadata back to the driver 204. In the case of a merged partition, the metadata can include what data types are contained in the merged partition associated with the partition path. The driver 204 then sends the execution plan to the execution engine 208 (e.g., the data computing engine). In an alternative implementation, the metadata and/or the partition merge rules are accessed directly from the metastore 210 by the execution engine 208.

In operation 506, the execution engine 208 determines the partition path for retrieval of the data for the query. The partition path is obtained from the metadata from the metastore 210. In example implementations, a merged partition path identifier looks similar to a regular/non-merged partition path identifier but can include a special character that the execution engine 208 knows indicates that the partition path is a merged partition path. For example, the special character (e.g., an arrow) can be positioned before the merged partition path identifier.

In operation 508, the execution engine 208 obtains, via the partition path, results from the Hadoop system 110. In some implementations, the execution engine 208 sends a job to the JobTracker, found in a Name node, and assigns it to the TaskTracker, in a Data node in the HDFS 214. In example implementations, the query executes in the MapReduce 212 at the Hadoop system 110 to retrieve the results from the HDFS 214. The execution engine 208 then receives the results from the Data node of the HDFS 214.

In operation 510, if the results were accessed from a merged partition, then in operation 512, the execution engine 208 filters the results to obtain just the data that corresponds to the query (also referred to as "requested data"). Because the results obtained from the merged partition contains not only the requested data but also data for other data types that have been merged into the same partition, the results need to be filtered to obtain just the requested data. Because the metadata comprises all logical partition values contained in the merged partition, this information is used to filter the result to obtain the requested data.

If in operation 510, a determination is made that the results did not come from a merged partition (e.g., it just contains the requested data) or after the filtering in operation 512, the requested data is returned in operation 514. In some implementations, the execution engine 208 sends the filtered results from a merged partition or unfiltered results from a non-merged partition back to the driver 204. The driver 204 then relays the requested data to the interface 202, which provides the results back to the client device 106.

Figure 6:
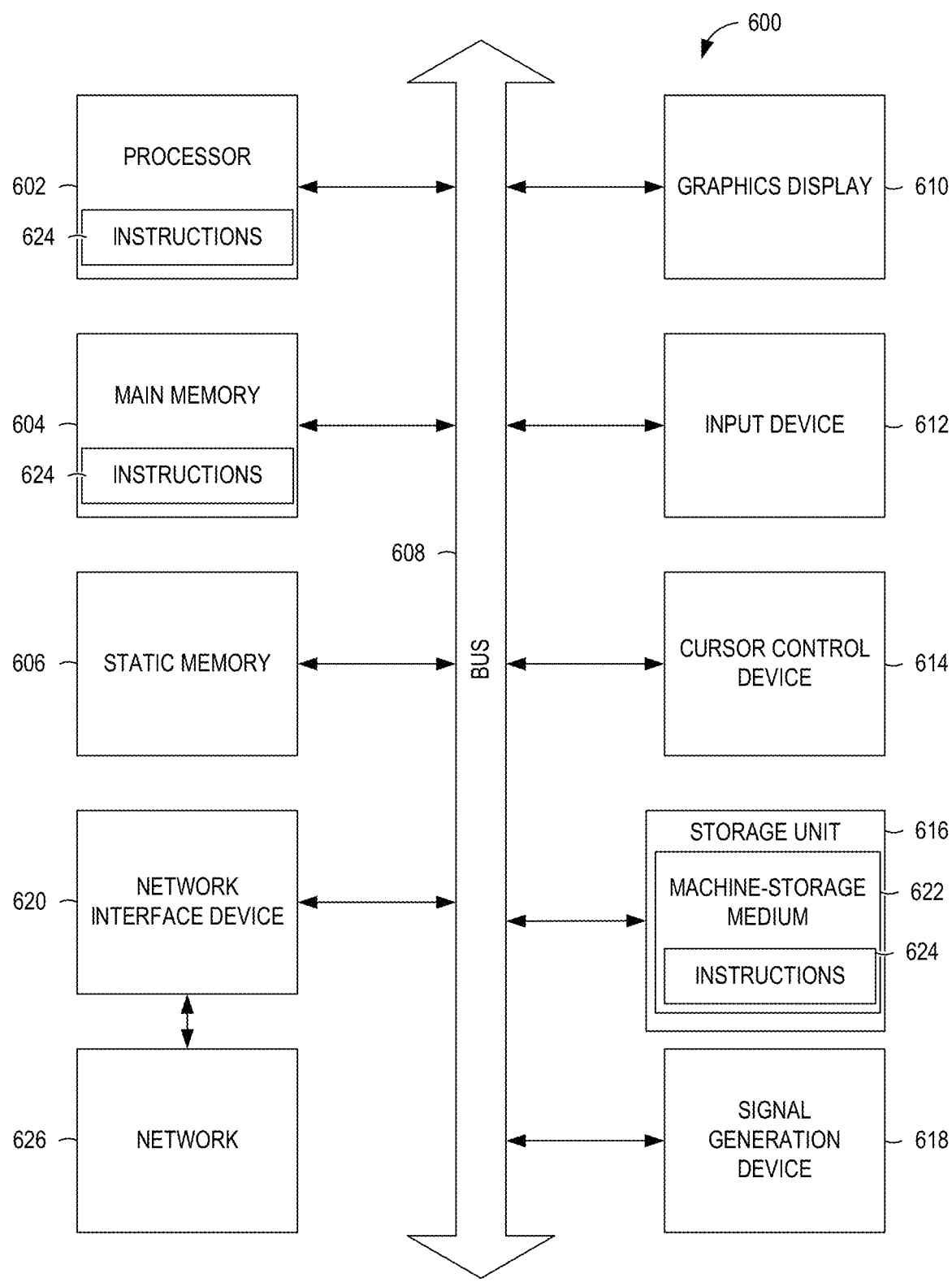
FIG. 6 is a block diagram illustrating components of a machine, according to some examples, able to read instructions from a machine-storage medium and perform any one or more of the methodologies discussed herein.

FIG. 6 illustrates components of a machine 600, according to some example implementations, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3 through FIG. 5. In one implementation, the instructions 624 can transform the machine 600 into a particular machine (e.g., specially configured machine) programmed to carry out the described and illustrated functions in the manner described.

In alternative implementations, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more components described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example implementations, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed implementations.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some implementations, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example implementations, the one or more processors or processor-implemented components may be located in a single geographic location (e.g., within a home environment, an office environment, or a server farm). In other example implementations, the one or more processors or processor-implemented components may be distributed across a number of geographic locations.

EXAMPLES

Example 1 is a method for optimizing partitioning of Hive tables. The method comprises analyzing data partitioning and query patterns associated with a file system; generating one or more merge rules for merging partitions of at least some data types that do not satisfy a query threshold based on the query patterns; registering the one or more merge rules into a Hive metastore; and based on the one or more merge rules, merging partitions of the at least some data types that do not satisfy the query threshold into a single physical partition of the file system.

In example 2, the subject matter of example 1 can optionally include accessing the one or more merge rules from the Hive metastore; determining whether the one or more merge rules apply to new data to be written to the file system; and based on the one or more merge rules applying to the new data, writing the new data to the single physical partition of the file system.

In example 3, the subject matter of any of examples 1-2 can optionally include synchronizing metadata of logical partition values contained in the single physical partition to the Hive metastore.

In example 4, the subject matter of any of examples 1-3 can optionally include receiving a query for data; accessing metadata and the one or more merge rules from the Hive metastore associated with the query; determining, based on the metadata, a partition location to retrieve the data; based on the partition location being the single physical partition, retrieving results from the single partition location; and filtering the results to obtain the data.

In example 5, the subject matter of any of examples 1-4 can optionally include wherein the filtering is based on the metadata indicating logical partition values contained in the physical partition.

In example 6, the subject matter of any of examples 1-5 can optionally include training a machine learning model to perform the analyzing and the generating; and using the machine learning model to automatically analyze the query patterns and generate the one or more rules.

In example 7, the subject matter of any of examples 1-6 can optionally include aggregating new query data; determining new query patterns based on the new query data; and based on the new query patterns, updating the one or more merge rules or generating one or more new merge rules.

In example 8, the subject matter of any of examples 1-7 can optionally include modifying an execution engine to support reading from and writing to the single physical partition, the modifying configuring the execution engine to consider the one or more merge rules when reading or writing.

Example 9 is a system for optimizing partitioning of Hive tables. The system comprises one or more processors and a memory storing instructions that, when executed by the one or more processors, cause the one or more processors to perform operations comprising analyzing data partitioning and query patterns associated with a file system; generating one or more merge rules for merging partitions of at least some data types that do not satisfy a query threshold based on the query patterns; registering the one or more rules into a Hive metastore; and based on the one or more merge rules, merging partitions of the at least some data types that do not satisfy the query threshold into a single physical partition of the file system.

In example 10, the subject matter of example 9 can optionally include wherein the operations further comprise accessing the one or more merge rules from the Hive metastore; determining whether the one or more merge rules apply to new data to be written to the file system; and based on the one or more merge rules applying to the new data, writing the new data to the single physical partition of the file system.

In example 11, the subject matter of any of examples 9-10 can optionally include wherein the operations further comprise synchronizing metadata of logical partition values contained in the single physical partition to the Hive metastore.

In example 12, the subject matter of any of examples 9-11 can optionally include wherein the operations further comprise receiving a query for data; accessing metadata and the one or more merge rules from the Hive metastore associated with the query; determining, based on the metadata, a partition location to retrieve the data; based on the partition location being the single physical partition, retrieving results from the single partition location; and filtering the results to obtain the data.

In example 13, the subject matter of any of examples 9-12 can optionally include wherein the filtering is based on the metadata indicating logical partition values contained in the physical partition.

In example 14, the subject matter of any of examples 9-13 can optionally include wherein the operations further comprise training a machine learning model to perform the analyzing and the generating; and using the machine learning model to automatically analyze the query patterns and generate the one or more rules.

In example 15, the subject matter of any of examples 13-14 can optionally include wherein the operations further comprise aggregating new query data; determining new query patterns based on the new query data; and based on the new query patterns, updating the one or more merge rules or generating one or more new merge rules.

In example 16, the subject matter of any of examples 13-15 can optionally include wherein the operations further comprise modifying an execution engine to support reading from and writing to the single physical partition, the modifying configuring the execution engine to consider the one or more merge rules when reading or writing.

Example 17 is a computer-storage medium comprising instructions which, when executed by one or more processors of a machine, cause the machine to perform operations for optimizing partitioning in Hive tables. The operations comprise analyzing data partitioning and query patterns associated with a file system; generating one or more merge rules for merging partitions of at least some data types that do not satisfy a query threshold based on the query patterns; registering the one or more merge rules into a Hive metastore; and based on the one or more merge rules, merging partitions of the at least some data types that do not satisfy the query threshold into a single physical partition of the file system.

In example 18, the subject matter of example 17 can optionally include wherein the operations further comprise accessing the one or more merge rules from the Hive metastore; determining whether the one or more merge rules apply to new data to be written to the file system; and based on the one or more merge rules applying to the new data, writing the new data to the single physical partition of the file system.

In example 19, the subject matter of any of examples 17-18 can optionally include wherein the operations further comprise synchronizing metadata of logical partition values contained in the single physical partition to the Hive metastore.

In example 20, the subject matter of any of examples 17-19 can optionally include wherein the operations further comprise receiving a query for data; accessing metadata and the one or more merge rules from the Hive metastore associated with the query; determining, based on the metadata, a partition location to retrieve the data; based on the partition location being the single physical partition, retrieving results from the single partition location; and filtering the results to obtain the data.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method comprising:
analyzing data partitioning and query patterns associated with a file system;
generating one or more merge rules for merging partitions of at least some data types that do not satisfy a query threshold based on the query patterns;
registering the one or more merge rules into a Hive metastore; and
based on the one or more merge rules, merging partitions of the at least some data types that do not satisfy the query threshold into a single physical partition of the file system.

2. The method of claim 1, further comprising:
accessing the one or more merge rules from the Hive metastore;
determining whether the one or more merge rules apply to new data to be written to the file system; and
based on the one or more merge rules applying to the new data, writing the new data to the single physical partition of the file system.

3. The method of claim 2, further comprising:
synchronizing metadata of logical partition values contained in the single physical partition to the Hive metastore.

4. The method of claim 1, further comprising:
receiving a query for data;
accessing metadata and the one or more merge rules from the Hive metastore associated with the query;
determining, based on the metadata, a partition location to retrieve the data;
based on the partition location being the single physical partition, retrieving results from the single partition location; and
filtering the results to obtain the data.

5. The method of claim 4, wherein the filtering is based on the metadata indicating logical partition values contained in the physical partition.

6. The method of claim 1, further comprising:
training a machine learning model to perform the analyzing and the generating; and
using the machine learning model to automatically analyze the query patterns and generate the one or more rules.

7. The method of claim 1, further comprising:
aggregating new query data;
determining new query patterns based on the new query data; and
based on the new query patterns, updating the one or more merge rules or generating one or more new merge rules.

8. The method of claim 1, further comprising:
modifying an execution engine to support reading from and writing to the single physical partition, the modifying configuring the execution engine to consider the one or more merge rules when reading or writing.

9. A system comprising:
one or more processors; and
a memory storing instructions that, when executed by the one or more processors, cause the one or more processors to perform operations comprising:
analyzing data partitioning and query patterns associated with a file system;

generating one or more merge rules for merging partitions of at least some data types that do not satisfy a query threshold based on the query patterns;

registering the one or more merge rules into a Hive metastore; and based on the one or more merge rules, merging partitions of the at least some data types that do not satisfy the query threshold into a single physical partition of the file system.

10. The system of claim 9, wherein the operations further comprise:

accessing the one or more merge rules from the Hive metastore;

determining whether the one or more merge rules apply to new data to be written to the file system; and based on the one or more merge rules applying to the new data, writing the new data to the single physical partition of the file system.

11. The system of claim 10, wherein the operations further comprise:

synchronizing metadata of logical partition values contained in the single physical partition to the Hive metastore.

12. The system of claim 9, wherein the operations further comprise:

receiving a query for data;

accessing metadata and the one or more merge rules from the Hive metastore associated with the query;

determining, based on the metadata, a partition location to retrieve the data;

based on the partition location being the single physical partition, retrieving results from the single partition location; and filtering the results to obtain the data.

13. The system of claim 12, wherein the filtering is based on the metadata indicating logical partition values contained in the physical partition.

14. The system of claim 9, wherein the operations further comprise:

training a machine learning model to perform the analyzing and the generating; and using the machine learning model to automatically analyze the query patterns and generate the one or more rules.

15. The system of claim 9, wherein the operations further comprise:

aggregating new query data;

determining new query patterns based on the new query data; and based on the new query patterns, updating the one or more merge rules or generating one or more new merge rules.

16. The system of claim 9, wherein the operations further comprise:

modifying an execution engine to support reading from and writing to the single physical partition, the modifying configuring the execution engine to consider the one or more merge rules when reading or writing.

17. A machine-storage medium comprising instructions which, when executed by one or more processors of a machine, cause the machine to perform operations comprising:

analyzing data partitioning and query patterns associated with a file system;

generating one or more merge rules for merging partitions of at least some data types that do not satisfy a query threshold based on the query patterns;

registering the one or more merge rules into a Hive metastore; and based on the one or more merge rules, merging partitions of the at least some data types that do not satisfy the query threshold into a single physical partition of the file system.

18. The machine-storage medium of claim 17, wherein the operations further comprise:

accessing the one or more merge rules from the Hive metastore;

determining whether the one or more merge rules apply to new data to be written to the file system; and based on the one or more merge rules applying to the new data, writing the new data to the single physical partition of the file system.

19. The machine-storage medium of claim 18, wherein the operations further comprise:

synchronizing metadata of logical partition values contained in the single physical partition to the Hive metastore.

20. The machine-storage medium of claim 17, wherein the operations further comprise:

receiving a query for data;

accessing metadata and the one or more merge rules from the Hive metastore associated with the query;

determining, based on the metadata, a partition location to retrieve the data;

based on the partition location being the single physical partition, retrieving results from the single partition location; and filtering the results to obtain the data.

* * * * *